US011474769B1

(12) United States Patent
Kumar et al.

(10) Patent No.: US 11,474,769 B1
(45) Date of Patent: Oct. 18, 2022

(54) SYSTEM AND METHOD FOR SIMULTANEOUSLY DISPLAYING MULTIPLE GUIS VIA THE SAME DISPLAY

(71) Applicant: APP-POP-UP INC., Winnipeg (CA)

(72) Inventors: Rajeev Kumar, Disraeli (CA); Rakesh Kumar, Disraeli (CA)

(73) Assignee: APP-POP-UP INC., Winnipeg (CA)

( * ) Notice: Subject to any disclaimer, the term of this patent is extended or adjusted under 35 U.S.C. 154(b) by 0 days.

(21) Appl. No.: 17/561,261

(22) Filed: Dec. 23, 2021

Related U.S. Application Data

(63) Continuation-in-part of application No. 17/443,563, filed on Jul. 27, 2021.

(51) Int. Cl.
| | | |
|---|---|---|
| *G06F 3/14* | (2006.01) | |
| *G06F 3/04845* | (2022.01) | |
| *G06F 9/451* | (2018.01) | |
| *G06Q 30/02* | (2012.01) | |
| *G06F 3/16* | (2006.01) | |

(52) U.S. Cl.
CPC ............ *G06F 3/14* (2013.01); *G06F 3/04845* (2013.01); *G06F 3/165* (2013.01); *G06F 9/451* (2018.02); *G06Q 30/0277* (2013.01); *G06F 2203/04803* (2013.01)

(58) Field of Classification Search
CPC ........ G06F 3/14; G06F 3/013; G06F 3/04845; G06F 3/04886; G06F 3/165; G06F 3/167; G06F 2203/04803; G06F 9/451; G06Q 30/0277
See application file for complete search history.

(56) References Cited

U.S. PATENT DOCUMENTS

| | | | | |
|---|---|---|---|---|
| 9,977,800 | B2* | 5/2018 | Shriber | G06F 16/951 |
| 10,198,155 | B2* | 2/2019 | Maheshwari | G06F 3/0484 |
| 10,305,758 | B1* | 5/2019 | Bhide | G06F 11/3466 |
| 11,044,179 | B1* | 6/2021 | Bettaiah | G06F 11/3419 |
| 11,144,545 | B1* | 10/2021 | Tankersley | G06F 11/323 |

* cited by examiner

*Primary Examiner* — Vijay Shankar
(74) *Attorney, Agent, or Firm* — Praxis (57) ABSTRACT

There is provided a system and for simultaneously displaying multiple graphical user interfaces via the same display. The multiple graphical user interfaces are hosted by one or more remote host controllers. A user device is in operative communication with the one or more remote host controllers and comprises an interface display for displaying one or more of the multiple graphical user interfaces. A system controller is in operative communication with the user display device. The system controller has a processor with an associated memory of processor executable code that when executed provides the controller with performing computer-implementable steps comprising separating the interface display in two or more interface display portions and selectively providing for two or more of the graphical user interfaces to be simultaneously displayed via respective ones of the two or more interface display portions.

19 Claims, 7 Drawing Sheets

SYSTEM AND METHOD FOR SIMULTANEOUSLY DISPLAYING MULTIPLE GUIS VIA THE SAME DISPLAY

CROSS-REFERENCE TO RELATED APPLICATIONS

The present application is a Continuation in part and claims benefit of U.S. patent application Ser. No. 17/443,563 filed on Jul. 27, 2021 and incorporated herein by reference in its entirety.

TECHNICAL FIELD

The present disclosure generally relates to computer graphical user interfaces including touch-displays. More particularly, but not exclusively, the present disclosure relates to a system and method for simultaneously displaying multiple graphical user interfaces via the same display such as a screen.

BACKGROUND

Computer graphical user interfaces using touch touch-displays are widely used on a daily basis on mobile units, tablets, laptops, PCs and other computers for a variety of purposes including streaming material for entertainment, educational or business purposes such as transactions including purchasing. Touch display screens can be capacitive or resistive. Resistive screens rely on applied pressure which means that sometimes the tip of a pen or another object can initiate a response from the system. Capacitive touch screens use electrical conductors rather than pressure to recognize a command and respond. Capacitive touch screens depend on a specific amount of electrical charge to get a response from the operating system. This electrical charge can be provided by the user's bare fingers or special styluses, gloves, and the like.

Merchants provide users with graphical user interfaces to view article or service information and to proceed to purchase. The merchant-provided user interfaces as usually "busy" with clickable material and adds as merchants are always trying to capture the attention of potential customers streaming in an online marketplace. One of the challenges merchants have is incentivizing users to view advertising material during live streams (such as sports, concerts and other events).

OBJECTS

An object of the present disclosure is to provide a system for simultaneously displaying multiple graphical user interfaces via the same display, wherein the multiple graphical user interfaces are hosted by one or more remote host controllers.

An object of the present disclosure is to provide a method for simultaneously displaying multiple graphical user interfaces via the same display, wherein the multiple graphical user interfaces are hosted by one or more remote host controller.

SUMMARY

In accordance with an aspect of the disclosure, there is provided a system for simultaneously displaying multiple graphical user interfaces via the same display, wherein the multiple graphical user interfaces are hosted by one or more remote host controllers, the system comprising: a user device in operative communication with the one or more remote host controllers and comprising an interface display for displaying one or more of the multiple graphical user interfaces; a system controller in operative communication with the user display device, the system controller having a processor with an associated memory of processor executable code that when executed provides the controller with performing computer-implementable steps comprising: separating the interface display in two or more interface display portions; and selectively providing for two or more of the graphical user interfaces to be simultaneously displayed via respective ones of the two or more interface display portions.

In an embodiment, the step of separating is automatically performed by the system controller. In an embodiment, the step of separating comprises the controller providing for the user to input a command via the user display device for separating the interface display. In an embodiment, the step of separating comprises the system controller providing an application to be stored in the user display device for separating the interface display in two or more interface display portions, wherein the system controller performs the computer implementable step of detecting that the interface display portion has been separated.

In an embodiment, computer-implementable steps further comprise resizing one of the two or more interface display portions to a full size of the interface display and removing remaining ones of the two or more interface display portions. In an embodiment, step of resizing is automatically performed by the system controller. In an embodiment, the step of resizing comprises the system controller providing for the user to input a command via the user display device for the resizing the one of the two or more interface display portions to a full size of the interface display and removing remaining ones of the two or more interface display portions. In an embodiment, the step of resizing comprises the system controller providing an application to be stored in the user display device for the resizing the one of the two or more interface display portions to a full size of the interface display and removing remaining ones of the two or more interface display portions, wherein the controller performs the computer implementable step of detecting that the interface display portion has been separated.

In an embodiment, the computer-implementable steps further comprise providing the interface display prior to the step of separating to display a main graphical user interface; and resizing the main graphical user interface during the step of separating reducing the size thereof fit into one of the two or more interface display portions thereby providing the main graphical user interface to continue being displayed.

In an embodiment, the computer-implementable steps further comprise selectively allowing sound from only one of the two or more of the graphical user interfaces to be emitted via the display device.

In an embodiment, the two or more of the graphical user interfaces are selected from the group consisting of: video content, media content, video game content, web pages, advertisement web pages, e-shopping web pages, e-banking web pages, financial transaction pages, browser pages, computer applications, interactive web pages, websites, social networks, telecommunication applications, videoconferencing applications and any combination thereof.

In an embodiment, one of the two or more graphical user interfaces comprises main content and the other of the two or more graphical user interfaces comprises auxiliary content. In an embodiment, the computer-implementable steps further comprise providing subject matter of the auxiliary content to be related to subject matter of the main content. In an embodiment, the computer-implementable steps further comprise selectively stopping advertisement blockers from blocking advertisement content in the auxiliary content.

In an embodiment, the computer-implementable steps further comprise providing for one or more of the two or more graphical user interfaces to comprise content uploaded from a geographic location that is near the geographic location of the user display device.

In an embodiment, one of the two or more graphical user interfaces comprises main content uploaded by a user having a user profile registered on in the memory of the system controller and another one of the two or more graphical user interfaces comprises advertisement content and shopping content, wherein the shopping content provides for device user to purchase goods and/or services, wherein the computer-implementable steps further comprise communicating with the remote host controller hosting the advertisement content and shopping content to detect if a purchase has been made; determining the user that uploaded the main content that was simultaneously displayed with the advertisement content and shopping content; and providing a reward to the determined user.

In an embodiment, the computer-implementable steps further comprise providing a user profile in the memory of the system controller; providing a system user to input commands in the user profile via the display device to register user preferences. In an embodiment, the computer-implementable steps further comprise separating the interface display based on the user preferences. In an embodiment, the computer-implementable steps further comprise selectively providing for two or more of the graphical user interfaces to be simultaneously displayed based on the user preferences.

In accordance with an aspect of the present disclosure, there is provided a method for simultaneously displaying multiple graphical user interfaces via the same display, wherein the multiple graphical user interfaces are hosted by one or more remote host controllers, the system comprising: providing interface display for displaying one or more of the multiple graphical user interfaces; separating the interface display in two or more interface display portions; and selectively providing for two or more of the graphical user interfaces to be simultaneously displayed via respective ones of the two or more interface display portions.

In an embodiment, an input command image is selected from the group consisting of and without limitation, an image, an icon, a window, a virtual keyboard, a word, a sign, a virtual console, a cursor, combinations thereof and the like for inputting one or more commands via touch, clicks, voice commands, eye orientation and the like.

Other objects, advantages and features of the present disclosure will become more apparent upon reading of the following non-restrictive description of illustrative embodiments thereof, given by way of example only with reference to the accompanying drawings.

BRIEF DESCRIPTION OF THE DRAWINGS

The following drawings form part of the present specification and present disclosure. In the appended drawings.

DETAILED DESCRIPTION OF ILLUSTRATIVE EMBODIMENTS

Generally stated and in accordance with an aspect of the present disclosure, there is provided a system for simultaneously displaying multiple graphical user interfaces via the same display. The multiple graphical user interfaces are hosted by one or more remote host controllers. A user device is in operative communication with the one or more remote host controllers and comprises an interface display for displaying one or more of the multiple graphical user interfaces. A system controller is in operative communication with the user display device. The system controller has a processor with an associated memory of processor executable code that when executed provides the controller with performing computer-implementable steps comprising separating the interface display in two or more interface display portions and selectively providing for two or more of the graphical user interfaces to be simultaneously displayed via respective ones of the two or more interface display portions.

Figure 1:
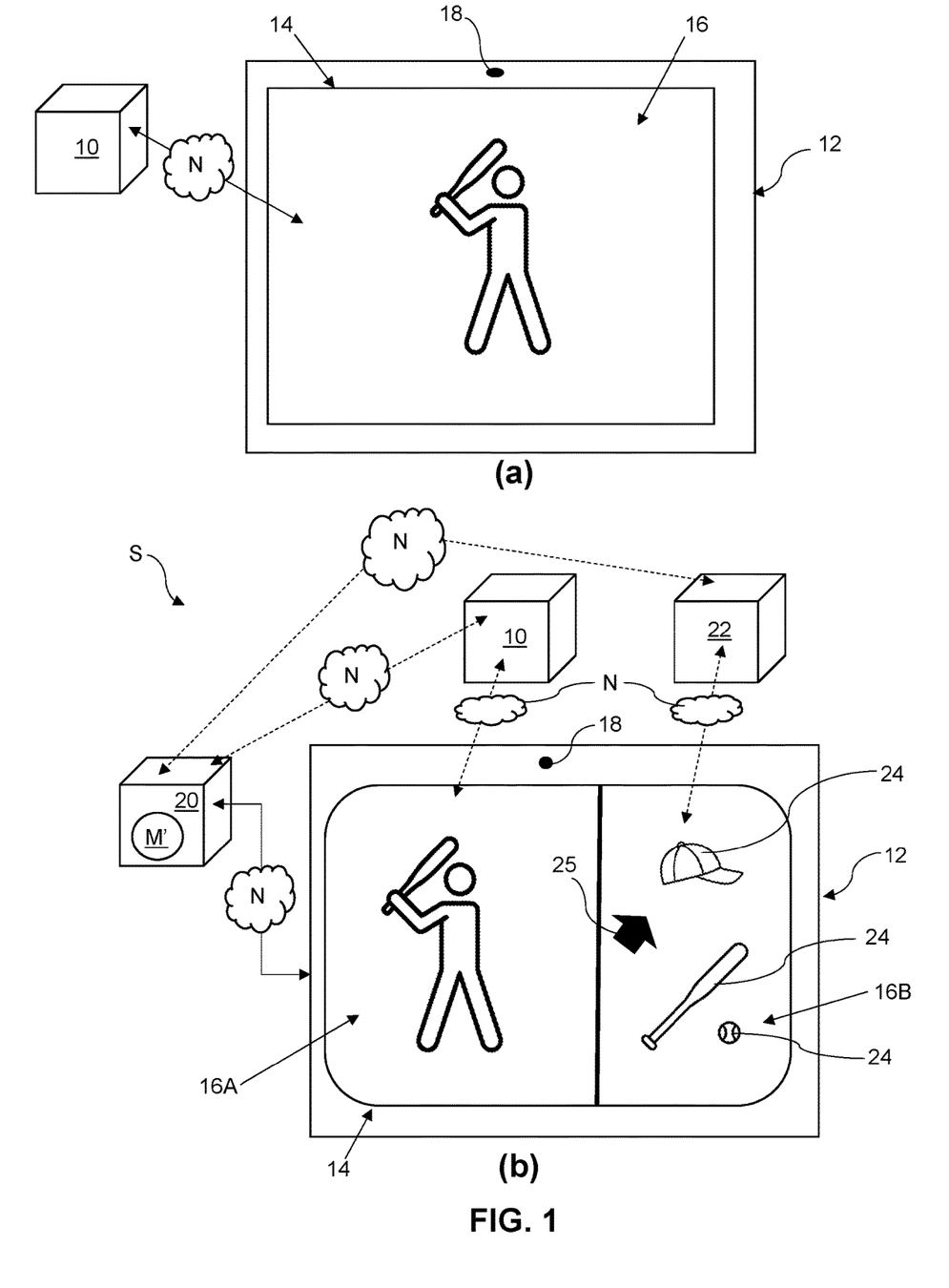
FIG. 1 is a schematic representation of a system for simultaneously displaying multiple graphical user interfaces via the same display showing a display running a user interface generated by a controller hosting a programme therefor in (a) and an interface system in (b) for simultaneously displaying multiple graphical user interfaces via the same display shown running the same graphical user interface in (a) via the same display in addition to simultaneously running another graphical user interface generated by the same or another controller hosting a programme therefor in accordance with a non-restrictive illustrative embodiment of the present disclosure.

With reference to FIG. 1, there is shown in (a) a remote server 10 hosting a program that is being run on a user device 12 via a network N communication. The user device 12 comprises an integrated device controller (not shown), a device display screen 14 for displaying a user interface 16 and an image capturing device 18. In (b), there is shown a system S for for simultaneously displaying multiple user interfaces via the same display. The system S comprises a controller 20 in a network N communication with device 12. The controller 20 has an associated memory M' of controller executable code that when executed provides for performing the computer implementable step of separating or splitting the user interface 16 into at least two interface portions or sub-interfaces 16A and 16B. Indeed, the screen 14 continues to run or display the program of host server 10 (in interface portion 16A) but in tandem it also runs a program from another host server 22 (in interface portion 16B). Of course, the programs producing the visual displays in interface portions 16A or 16B may be from the same host server (10 or 22, for example). In an example, interface portion 16A shows a sporting event while interface portion 16B juxtaposed to sub-interface 16A provides for advertising articles 24. Indeed articles 24 may be input images as described in U.S. Ser. No. 17/443,563 and can be operated by touch commands, cursor clicks, eye orientations (e.g., φ) as described in U.S. Ser. No. 17/443,563, voice commands and combinations thereof.

In an embodiment, the controller 20 provides for the user device 12 to access both programs from both hosts 10 and 22 (or a single host or multiple host as can be contemplated by the skilled artisan) or the controller 20 communicates via a network N with these hosts 10 and 22 to receive their program data and to recommunicate this data to the device 12 in a single visual display on the same screen 14 separated or split in portions to run both programs simultaneously.

Thus, the controller 20 (i.e. a server, cloud server or network of servers or data center and the like) of the system S provides by computer implementable steps to run two different programs on the user device 12 (e.g. handheld tablet) via the controller thereof, in order to display two different and unrelated interfaces or sub-interfaces or interface portions 16A and 16B. The controller 20 can return to one of the two or more juxtaposed interfaces and hence run one program. Thus, the controller 20 provides for advertising in tandem or providing options to the user for advertisements or provide options to the user to watch another simultaneous event or view highlights of that simultaneous event and so one and so forth.

In an embodiment, the system S provides for the user to choose to run more than one program on their display device screen 14. Thus, the controller 20 separates the interface 16 is portions 16A and 16B based on an X,Y cartesian table of pixels, where a portion of the pixels will display one program and another portion of the pixels will display another program.

Figure 2:
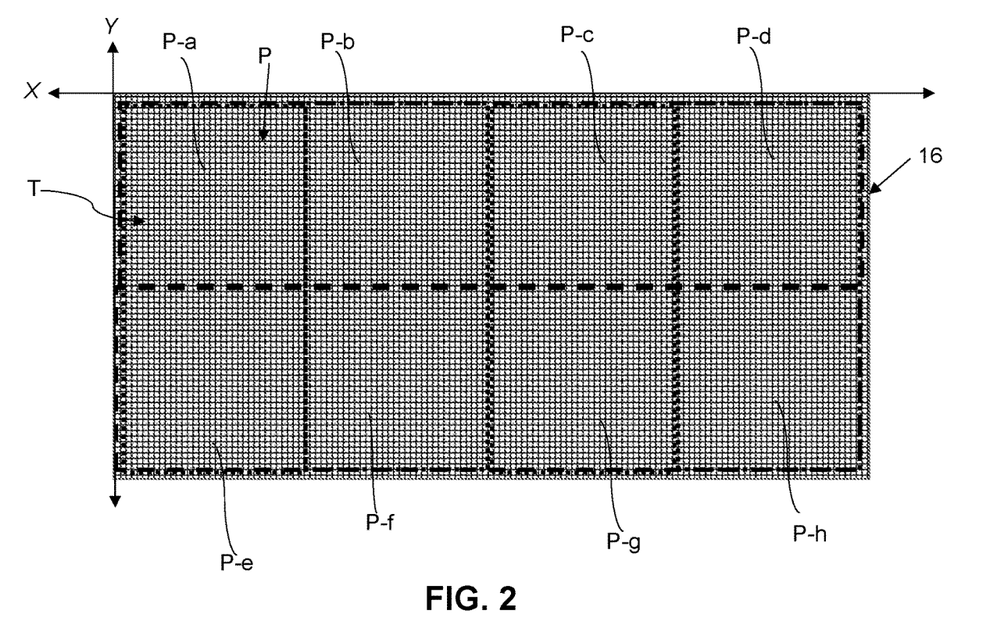
FIG. 2 is a schematic representation of computer generated cartesian table of a displayed graphical user interface of the present system with one more computer-generated interface display portions of the graphical user interface in accordance with a non-restrictive illustrative embodiment of the present disclosure.

Turning now to FIG. 2, the system S and method herein provide by way of the computer-implemented steps for generating a cartesian table T of a display screen 14 for displaying a graphical user interface 16. The cartesian table T includes a vertical Y axis and a horizontal X axis defining a plurality of given coordinates $(X_n, Y_n)$ for each given pixel P. Thus, the controller provides for separating a graphical user interface into interface portions thereof such as portions P-a, P-b, P-c, P-d, P-e, P-f, P-g, P-h. A given portion P-a contains pixels P within coordinates (Xa', Ya') to (Xa" Ya"). As such, the system and method by way of the computer implementable steps determine which display screen portions (P-a to P-h) will display a given program. Therefore, the system and method herein provide for a graphical user interface 16 to display a given program in a given one or given ones of these portions from one or more host servers as previously explained.

Of course, the interface 16 may be separated in any number of portions as is visually and usefully convenient. The size of the portions may be modulated by the controller 20, the user, the program hosts and combinations thereof. Thus, any convenient ratio can be used for screen splitting. Moreover, the screen can be split vertically as shown in (b)

of FIG. 1 or horizontally. The foregoing may be modulated by the controller 20, the user, the program hosts and combinations thereof.

As such, in one example, a user can enjoy a sporting event or other online streaming product and can simultaneously view advertising without interruption of their main entertainment as two interfaces are being simultaneously run by the system S. The user can also purchase products in tandem via an input image as described in U.S. Ser. No. 17/443,563. Indeed, the double interface shown in (b) of FIG. 1 may also include a command input image as described in U.S. Ser. No. 17/443,563 such as a cursor 25 that moves with the field of view orientation ϕ as described in U.S. Ser. No. 17/443,563 to move across both sub-interfaces 16A and 16B so that the user can input commands via the cursor by clicking, voice commands and the like. The input image may include other command input applications and not be a cursor but an icon or window for receiving one more input commands.

In an embodiment, the systems herein provide for users to open an application in order to access the systems and methods herein, as such, in one example, the user opens the system application which identifies the user via visual recognition (face, eyes, iris), or touch recognition, or fingerprint recognition, or via voice command or a security password or any combination thereof. As such, the application provides for accessing one or more of the operating systems herein, such as the ability to modulate and/or operate input images via eye orientation ϕ as described in U.S. Ser. No. 17/443,563, the ability for the system to split the user interface and display two or more programs in tandem, the ability for the user to move an input image (such as a cursor, or a game console image) along one interface or a plurality of juxtaposed interfaces or interface portions or sub-interfaces via the same display screen including selectively rendering the command input image visible or invisible by user input commands or by predetermined computer-implementable steps.

Figure 3:
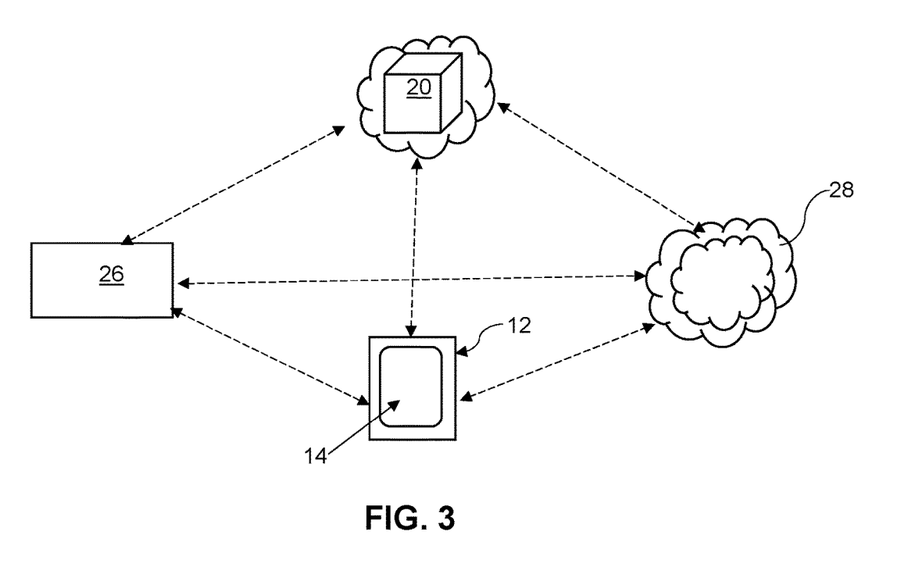
FIG. 3 is a schematic a system for simultaneously displaying multiple graphical user interfaces via the same display in accordance with a non-restrictive illustrative embodiment of the present disclosure.

FIG. 3 shows the system S comprising the controller 20 such as a cloud server, in remote operative communication with the user display device 12. There is also shown a data center 26 and a content delivery network (CND) 28. Various operative communications can be provided within the communication architecture of system S.

The controller 20 can be in remote operative communication with the data center 26 and/or the CDN 28. The data center 26 and the CDN 28 can be in remote operative communication. The data center 26 and/or the CDN 28 can be in remote operative communication with the user device 12. In this way, the controller 20 can modulate the graphical user interface 16 of the user device 12 by receiving the content for display from the data center 26 and/or the CDN 28 directly and modulating the content at the controller level in order to transmit the content to the user device 12 for display in the modulated format. It is understood that the modulation referred to herein refers to the selective separating/splitting (or resizing) of the graphical user interface 16 as provided herein.

In an embodiment, the user device 12 receives content directly from the data center 26 and CDN 28 and the displayed content is modulated by the controller 20 at the device 12 level for simultaneous display as provided herein. In an embodiment, the user device 12 communicates with the data center 26 and/or the CDN 28 directly to access content for display. In another embodiment, the user device 12 communicates with the data center 26 and/or the CDN 28 via the controller 20 to access content for display.

Figure 4:
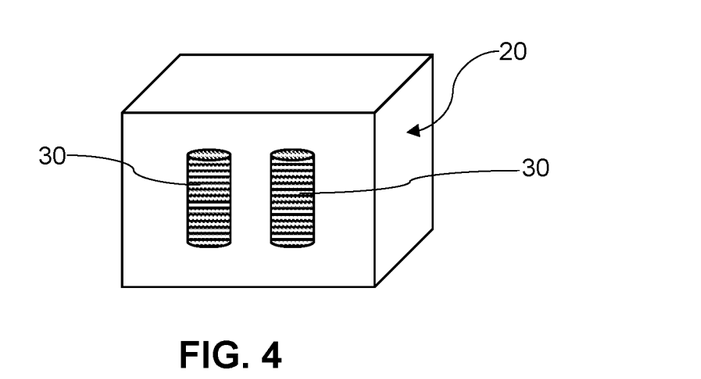
FIG. 4 is a schematic representation of the controller of the system for simultaneously displaying multiple graphical user interfaces via the same display in accordance with a non-restrictive illustrative embodiment of the present disclosure.

As shown in FIG. 4, the controller 20 comprises a user profile 30 for each system user. A user can access the system S by logging into the controller 20 via an identification code for example or other identification as described above. In an embodiment, the user profile 30 provides for registering content streaming preferences as will be further discussed herein. The user profiles 30 are stored within the memory M of the controller such as within a database thereof.

Figure 5:
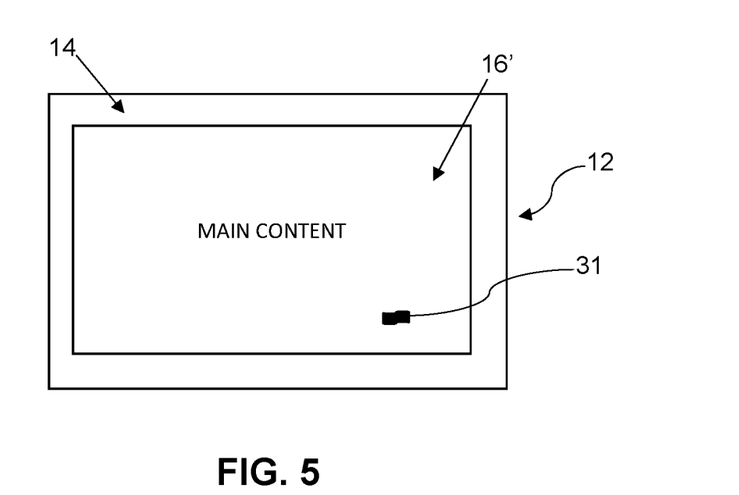
FIG. 5 shows a display device with a screen displaying a graphical user interface displaying main content, the display device being in operative communication with the system controller in accordance with a non-restrictive illustrative embodiment of the present disclosure.

In an embodiment shown in FIG. 5, the user views main content on via their screen 14 via graphical user interface 16'.

Figure 6:
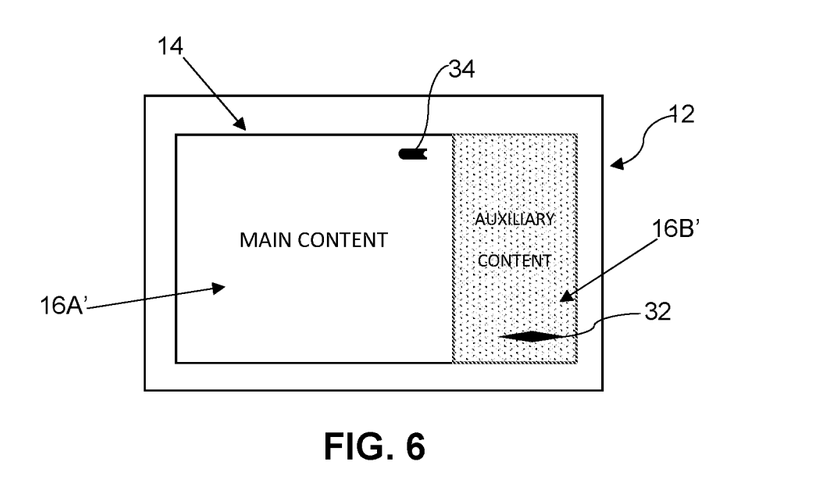
FIG. 6 shows the display device of FIG. 5 with the graphical user interface having been separated by the controller to provide for two interface portions for simultaneously displaying via the screen the main content in addition to auxiliary content in accordance with a non-restrictive illustrative embodiment of the present disclosure.

As shown in FIG. 6, the screen 14 is "split" or "resized" in that the graphical user interface 16' is divided (or separated) into a main portion 16A' and an auxiliary portion 16B' respectively and simultaneously displaying independent main and auxiliary content. This "screen splitting" can be selectively modulated by the controller 20 or requested by the user. For example, if the main content happens to be a commercial, the user can click on the interface 16' and this will resize or split the interface 16' into a main portion 16A' running the main content that was running on the interface 16' without interruption while generating an auxiliary portion 16B' which provides, for example, purchasing information related to the product in the commercial (main content). In another example, the controller 20 interface 16' generates a temporary input command image 31 (see FIG. 5) that disappears after a time frame if no input is provided. The input image 31 can indicate the type of auxiliary content the controller 20 can stream in an auxiliary screen portion. If the user inputs a command via touch, click, voice and the like the interface 16' is split or resized to show a main portion 16A' running the main content of interface 16' without interruption and an auxiliary portion 16B' streaming the auxiliary content.

In an embodiment, the auxiliary portion 16B' advertises a product that can be associated with the main content. For example, controller 20 executes the computer-implementable step of identifying articles (such as 24 in FIG. 1) within the main content provided by a host sever 10 (see FIG. 1) or the data center 26 (see FIG. 3) and accessing the auxiliary content via one or more other host server 22 (as in FIG. 1) or the CDN 28 (FIG. 3). In one example, a character in a movie (main content) has been wearing a cap or has been fishing or is eating pasta, the controller 20 provides for the server 22 or CDN 28 to communicate an advertisement (auxiliary content) in the auxiliary portion 16B' related to caps, fishing, and/or pasta. Thus, advertisements in the auxiliary content can be related to elements (products, actions, scenarios) in the main content. Furthermore, the information in the user profile 30 provides the controller 20 with the computer implementable step of evaluating advertised content provided by the a sever 22 or a CDN 28 that fits the user's interests as evaluated by their streaming behavior (i.e. content that they stream, e.g. types of products, brands, activities) or that they have indicated in their user profile 30 as being of interest. Thus, the auxiliary content is tailored to suit the user via streaming behavior or user profile 30 information.

The information in the user profile 30 can be collected via a system S provided questionnaire in order to prompt the user to indicate their interests and preferences or by direct inputs from the user without prompting. The user profile 30 can also be modulated by clustering user profiles 30 that are similar based on geography, age group, gender and other socio-economic and cultural parameters, to create clusters of interests. The auxiliary content that would be advertised can be based on these clusters of interest, i.e a given user belongs to a given cluster of interests and thus auxiliary content of interest will be shown that may also be related to the currently streamed main content thereby optimizing interest of a given user for a given advertisement. Indeed, various algorithms for advertising to content users are already used in social media and similar ones can be used in system S.

In an embodiment, the auxiliary portion 16B' comprises input command images 32. Input, can be provided by touch, clicks, voice and the like. In an embodiment, a user the user to "like" the content and thus register this information to the user profile 30. In an embodiment, the touch or clickable commands 32 provide for the user to close the auxiliary portion 16B' and return to the main content "resizing" the screen 14 in that only that the main portion 16A' returns the full size of the interface 16' (as in FIG. 5). In an embodiment, the input for returning to the main content can be provided by input command images 34 in the main portion 16A'.

In an embodiment, the input command images 32 provide for the user to access more information related to the advertised product and move towards a purchase page or a checkout all within the auxiliary portion 16B' being simultaneously displayed along with the main content in the main portion 16A'.

Figure 7:
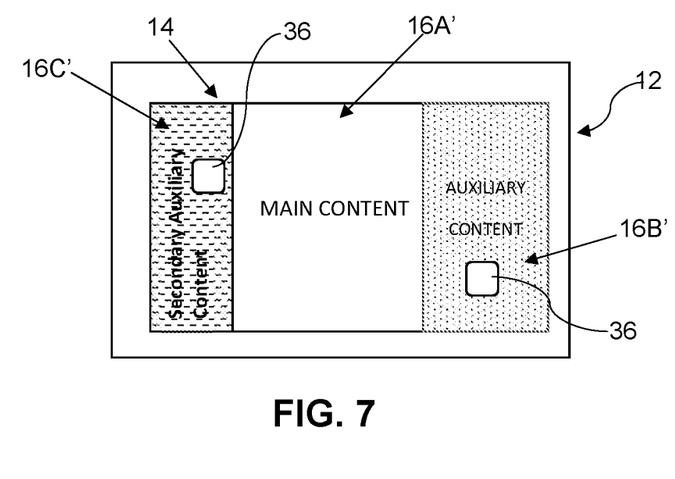
FIG. 7 shows the display device of FIG. 5 with the graphical user interface having been separated by the controller to provide for three interface portions for simultaneously displaying via the screen the main content in addition to auxiliary content as well as secondary auxiliary content in accordance with a non-restrictive illustrative embodiment of the present disclosure.

In an embodiment, as shown in FIG. 7, a secondary auxiliary portion 16C' is provided in which the user can view secondary auxiliary content. For example, the secondary auxiliary content may provide purchase information related to the product advertised in the auxiliary content displayed via the auxiliary portion 16B'. In an embodiment, the auxiliary portion 16B' or the secondary auxiliary portion 16C' provide for communicating with the merchant via a communications window 36 for example, to receive merchant information related to the advertised content. The secondary auxiliary portion 16C' can be generated by the user clicking on the auxiliary portion 16B' or by the user inputting a command therefor via the input command image 32.

In an embodiment, the auxiliary content does not include sound and thus, there is no interruption of the main content sound. In an embodiment, the auxiliary content includes sound and when the system S runs auxiliary content, the sound of the main content is muted, and the user can only experience the main content visually as the only sound emitted is that of the auxiliary content.

Figure 8:
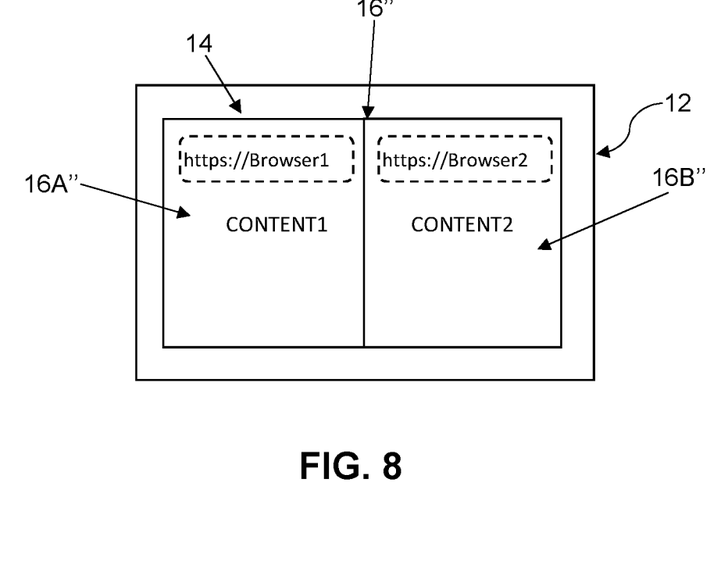
FIG. 8 shows a display device with a screen in operative communication with the system controller simultaneously displaying two browser pages in respective interface portions via the same screen in accordance with a non-restrictive illustrative embodiment of the present disclosure.

In an embodiment, shown in FIG. 8, an interface 16" is split into two independent sub-interfaces 16A" and 16B" allowing for running two independent browsers simultaneously or two different apps simultaneously. In this case, there is no main content per se, there is simply multiple content on respective portions. Of course, more portions can be provided with more browsers and/or applications. In an embodiment, the one of the sub-interfaces runs a browser and another an app.

In an embodiment, when viewing main content on an interface 16', the user can choose to share this main content, and this split the screen to produce a main interface portion 16A' showing the main content without interruption and an auxiliary interface portion 16B' providing an input page to enter email, phone number, name or other contact information so as to share the main content with one or more contacts. This information can be entered by keyboard inputs, by selecting a name in a contact list or by voice command. Thus, in an embodiment, the user profile 30 contains or has access to a user contact list.

The user can click on the interface 16' and input command images 31 can be generated with various possible auxiliary content such as an advertisement page, a browser page or a share page and the like.

In an embodiment, the auxiliary content is a social media page and the main content is shared in the social media page by dragging and dropping or simply by a click or other like commands including voice commands, touch commands or social media page commands. Indeed, the user can simultaneously view main content and participate in a social media network in the auxiliary content part of their screen commenting on the main content which can be media, a movie, a sporting event, news events, a video game and other accessible content.

In an embodiment, when sharing content as provided herein, the controller 20 may have the user profile 30 of the individual the content is being sent to and thus in the case where this user is viewing main content on their interface 16', the controller 20 can inform the user via a visual or audial cue or via an input command image 31 that a sender wishes to share content. Thus, the receiving individual can request a screen split or resizing (i.e. interface separating) with their main content continuing to be displayed via an interface portion 16A' and the shared content being shown via the auxiliary portion 16B'.

In an embodiment, when the main content is a commercial or infomercial and the user wishes to purchase a given product advertised in the main content, user input commands provide for auxiliary content to be simultaneously displayed in the split screen or resized interface mode provided herein in order to run an online shopping page where the advertised product or products can be purchased.

Figure 9:
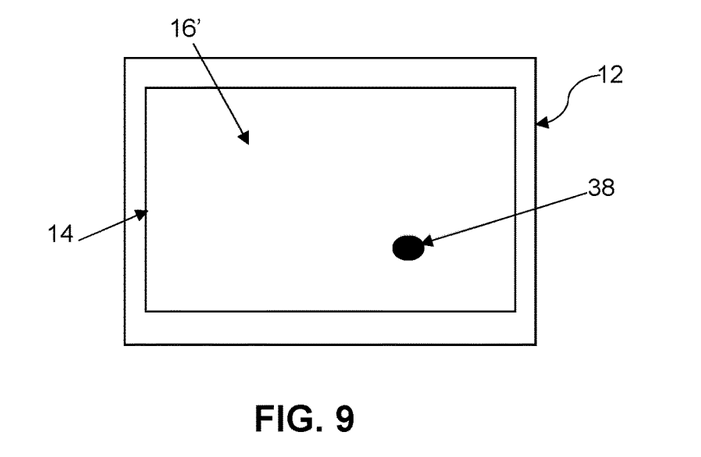
FIG. 9 shows a display device with a screen in operative communication with the system controller displaying in a graphical user interface an input command image in accordance with a non-restrictive illustrative embodiment of the present disclosure.
Figure 10:
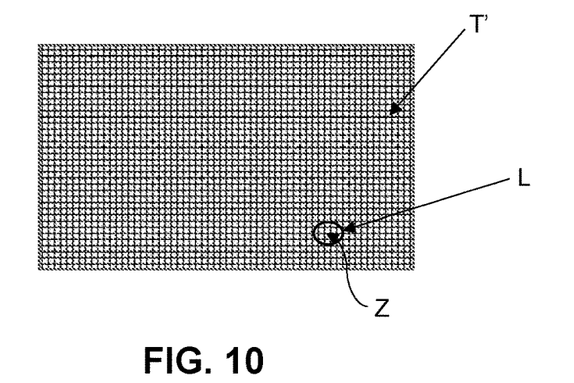
FIG. 10 is a computer generated cartesian table of pixels of the graphical user interface of FIG. 9 showing the position in the cartesian table of the input command image and the pixel zone covered thereby in accordance with a non-restrictive illustrative embodiment of the present disclosure.

In an embodiment and with reference to FIGS. 9 and 10, the main content running on the interface 16' includes integrated input command images 38 as described in U.S. Ser. No. 17/443,563 that correspond to the location L within the cartesian table T' corresponding to the interface 16' of input command images 38. The input command images can be articles for example shoes worn by soccer players or helmets worn by hockey players or foods being eaten by actors, or computers in a news program and the like. Therefore, when a user sees an article of interest, they click on this article that corresponds to an input command image 38 (i.e. acts an input command image described in U.S. Ser. No. 17/443,563) and the interface 16' is separated, resized or split to allow auxiliary content related to the article of interest to be displayed in the auxiliary portion 16B' while the main content continues to be simultaneously displayed via the main portion 16A'. Thus, the controller 20 executes the computer implementable step of identifying pixel zones Z within the cartesian table T' which correspond to articles of interest in the main content and thus provides for the pixel zones Z which are changing in real time as the position of the article of interest changes in real time within a streamed scene of the main content. Thus, the user clicks on the article of interest or touches the screen 14 at a position corresponding to the position of the article of interest thereby clicking on or touching the pixel zone Z corresponding to the article of interest and as such inputting the command to simultaneously display auxiliary content related to the article of interest as explained above.

Figure 11:
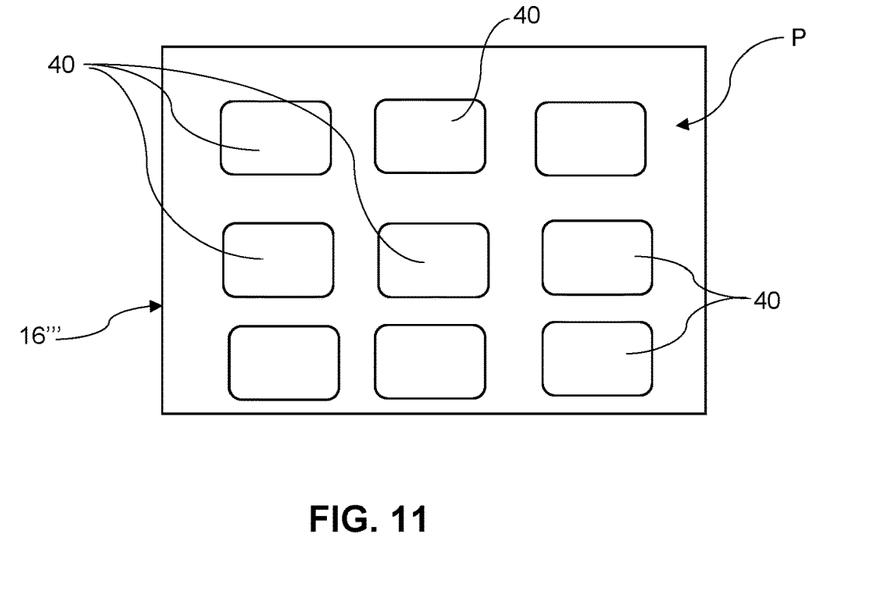
FIG. 11 shows a system platform interface for streaming and uploading video content in accordance with a non-restrictive illustrative embodiment of the present disclosure.
Figure 12:
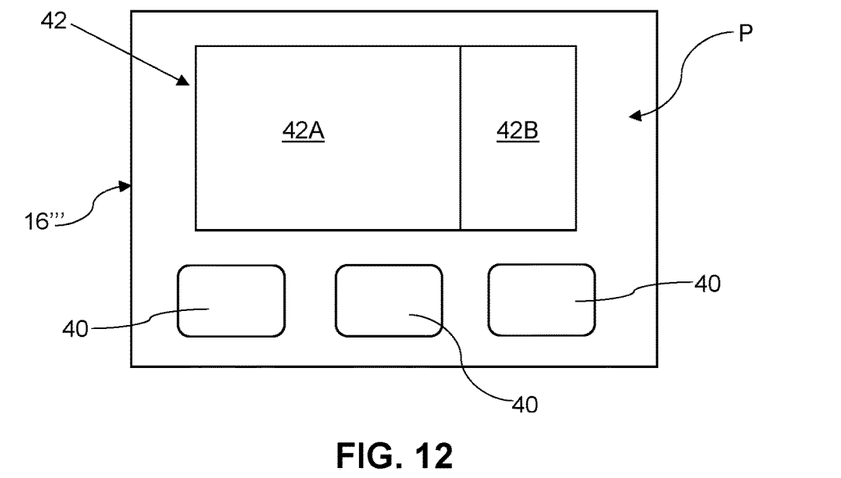
FIG. 12 shows the platform of FIG. 8 with selected video content being streamed in a platform interface display being separated in display portions respectively and simultaneously displaying main and auxiliary content in accordance with a non-restrictive illustrative embodiment of the present disclosure.
Figure 13A:
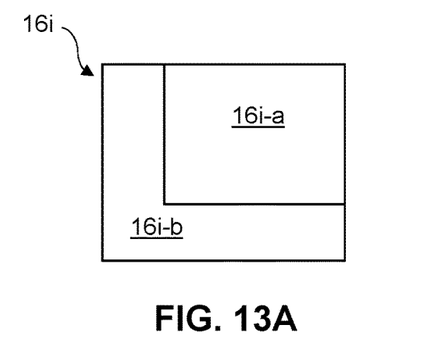
FIG. 13A shows a separated interface display configuration with two interface display portions thereof simultaneously displaying respective content in accordance with a non-restrictive illustrative embodiment of the present disclosure.
Figure 13B:
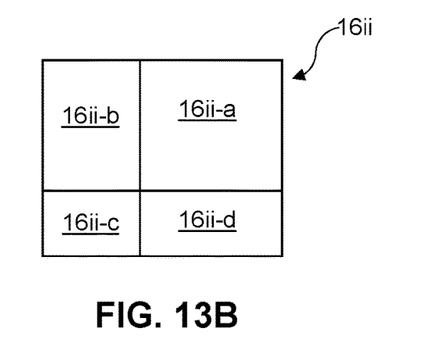
FIG. 13B shows a separated interface display configuration with two four display portions thereof simultaneously displaying respective content in accordance with a non-restrictive illustrative embodiment of the present disclosure.
Figure 13C:
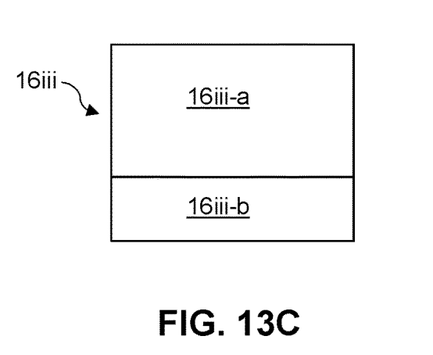
FIG. 13C shows a separated interface display configuration with two interface display portions thereof simultaneously displaying respective content in accordance with a non-restrictive illustrative embodiment of the present disclosure.
Figure 13D:
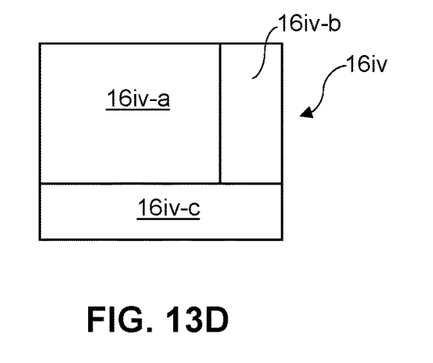
FIG. 13D shows a separated interface display configuration with two three display portions thereof simultaneously displaying respective content in accordance with a non-restrictive illustrative embodiment of the present disclosure.
Figure 13E:
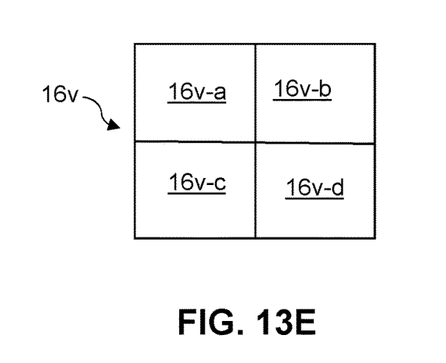
FIG. 13E shows a separated interface display configuration with two four display portions thereof simultaneously displaying respective content in accordance with a non-restrictive illustrative embodiment of the present disclosure.
Figure 13F:
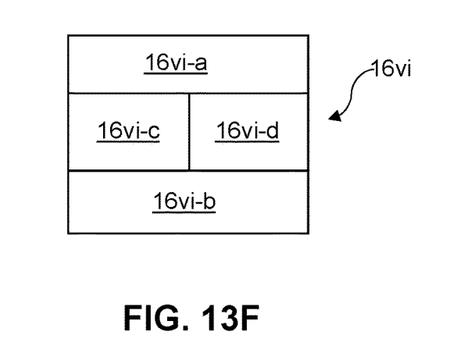
FIG. 13F shows a separated interface display configuration with two four display portions thereof simultaneously displaying respective content in accordance with a non-restrictive illustrative embodiment of the present disclosure.

In an embodiment, and with reference to FIGS. 11 and 12, the system S provides a platform P for users to upload their video content 40 to be viewed by users of the platform P. Thus, the platform P provides a main interface 16''' with various video content 40 for being viewed by platform users. When a user selects a given video 40 for viewing, a video interface 42 opens within the main interface 16''' as shown in FIG. 12 in order to stream the main content. At a predetermined point during streaming of the main content, the controller 20 splits the interface 42 into a main portion 42A which continues to stream the main content without interruption and an auxiliary portion 42B which displays auxiliary content such as advertising and then removes the auxiliary content to resize the interface 42 back to its original size. The user can choose via an input command as provided herein to access information in the auxiliary portion 42B or to move to a check out command section where they can purchase the produce being advertised and in this case, the controller 20 registers this action and the user who uploaded the video content that lead to the purchase is compensated via points or financially by way of a percentage on sales generated and the like.

In an embodiment, the platform P allows advertisers who wish to advertise when video content 40 is being streamed as provided herein to modulate their advertisement such that it is clickable in that an click input command will lead to a shopping interface (for example) within the auxiliary portion 42B. In another embodiment, a user who uploads video content can modulate the type of advertisement that can be displayed in the auxiliary portion 42B, for example they may request that certain products not be advertised (alcohol, meat, etc.) or that the advertisements are not clickable and are only provided as information. The foregoing information is pre-stored within the user profiles 30. In an embodiment, an advertisement may include a code for the viewer and the viewer may then shop on another platform using the code. The code may be used to provide a rebate to the shopper or a reward to the content provider.

Examples of configurations in screens, content can be changed from one sub-interface to another, different resizing or splitting shapes, user can select which ones they like when viewing, the resizing can be done based on user's device screen. The user can modulate and put this in profile.

In an embodiment, the step of separating the interface into interface portion comprises the controller 20 providing the device 12 with an application to be stored thereon that allows for user inputs prompted and or unprompted to separate in an interface into portions thereof simultaneous display of separate content. The application communicates with the controller 20 via the device 12 which knows that a split has occurred and can allow additional content to be shown on the additional interface portion or portions as provided herein. Thus, in this case it is not the controller 20 that separates the interface but an application stored on the device 12 provided by the controller 20 and in communication therewith.

The controller 20 is in communication with the device 12 and detects the size, shape and configuration of the screen as well as the pixels in the cartesian table T or T' thereof in order to resize the screen in a suitable split screen mode or coni Different types of splits will be required for different types of screens depending on the device being used. For example, a smartphone, a tablet, a laptop, a smart TV have different screen sizes and different pixel definitions, and this requires different screen split configurations.

Turning to FIGS. 13A, 13B, 13C, 13D, 13E and 13F, there are shown non-limiting examples of separated interfaces 16*i*, 16*ii*, 16*iii*, 16*iv*, 16*v*, and 16*vi* respectively. In this example, interface 16*i* is separated in a square interface portion 16*i-a* and an L-shaped portion 16*i-b*. Interface 16*ii* is separated horizontally and vertically with four portions 16*ii-a*, 16*ii-b*, 16*ii-c*, and 16*ii-d*. Interface 16*iii* is separated horizontally with a top larger portion 16*iii-a* and a bottom narrower portion 16*iii-b*. interface 16*iv* is separated vertically with main a portion 16*iv-a* and an auxiliary portion 16*iv-b* and is also separated horizontally providing a secondary auxiliary portion 16*iv-c*. Interface 16*v* is separated vertically and horizontally in four equal square portions 16*v-a*, 16*v-b*, 16*v-c* and 16*v-d*. Interface 16*vi* is separated horizontally with a top portion 16*vi-a*, a bottom portion 16*vi-b*, and two vertically separated median portions 16*vi-c* and 16*vi-d*.

Of course, still other configurations with more or less portions can also be provided as will be readily understood by the skilled artisan.

Moreover, the user can switch the content displayed in the various portions in other words content shown in one given portion can be shown in another an vice versa with an input command that is communicated to the controller 20 or that is provided by the application stored on the device 12 as previously explained. The user can also select a preferred split mode configuration. The controller 20 can provide the user with a selection of interface divided configurations and the user's choices are registered in their profile 30 so that interface separation for a given user is based on the user's preferences.

In an embodiment, the add blocker of a user's device 12 will not block auxiliary content (if it is desired) on the auxiliary portion. In this case, a host server (10 or 22 in FIG. 1 for example) sends its content to the user device 12 via the controller 20 which allows the content to be shown in the auxiliary interface portion bypassing the add blocker as it is the controller 20 that is sending the content to the user device 12 and not the host server (such as 10 or 22). Of course, in an embodiment, this is configurable by the user and can be registered in their profile 30.

In an embodiment, system users can download or stream a video game from a server including the controller 20 or another host server 10 or 22, or the data center 26 or the CDN 28 etc. In any event, the controller 20 is in remote and operative communication with the user's device 10. During game play, the controller 20 can execute the computer implementable step of separating or splitting the screen interface display as provided herein to run an advertisement in an auxiliary interface portion as provided herein. The controller 20 can also stop the game pausing the current play to run auxiliary content in the auxiliary xddd into their systems but the user's device screen will always be connected with the server through the network so that server can split the user's device screen or stop the video game during playing of video game to run ads.

In an embodiment, is a user does not have a high-speed internet connection and requires same in order to download a game for example, the controller 20 will execute the computer implementable step of connecting with a high-speed internet connection to compensate for the user's connection. This can be done automatically by the controller 20 or upon an input command request for the user. Thus the system S provides a high-speed internet connection to the user's device 12 (PC, tablet, smartphone, etc.) via the controller 20 or via another host server as provided herein to allow the user to download the game on their device 12 and play later on when download is complete.

In an embodiment, the controller 20 connects with another host server to which provides a high-speed internet connection, and a video game or other content is streamed in the user's device 12. Thus, If the user does not have a high-speed internet connection and they are connected to the host server 10, the controller 20 will download the game in its database and stream it through the user's device 12 thereby avoiding the lag time due to the internet connection. The controller 20 automatically connects with a high-speed internet connection providing the game to be played on the device 12.

When a user's device 12 connects with the controller 20, the controller performs the computer implementable step of detecting the user's device 12 details like IP, MAC address, program viewing, size of screen, resolution of screen, pixels, model, manufacturer, location and the user via their profile 30 once registered including preferences as provided herein.

In an embodiment, when a user uploads content unto the platform P or the controller 20 or another host server 10, 22 or data center 26 through the controller 20. the controller 20 register's in the user's profile 30, the location of where the content originated from on a virtual map within the memory M. Thus when another user searches for local content the controller 20 can provide the searching user with local content. This may be convenient for receiving local advertisements for example. Local can mean within the same area of a city, the same city, county, state or province or other geographical proximity that can be modulated by the searching user via input commands that can be registered in their preferences within their user profile 30. In an embodiment, when user uploads content as provided herein, their location is registered by the controller 20 and the location of the searching user is also registered by the controller 20 which can provide local search results by way of predetermined geographical proximity thresholds.

In an embodiment, an uploading user can choose another territory as their content location rather than their physical territory.

In an embodiment, a searching user can choose another territory as their search location rather than their physical territory.

Figure 14:
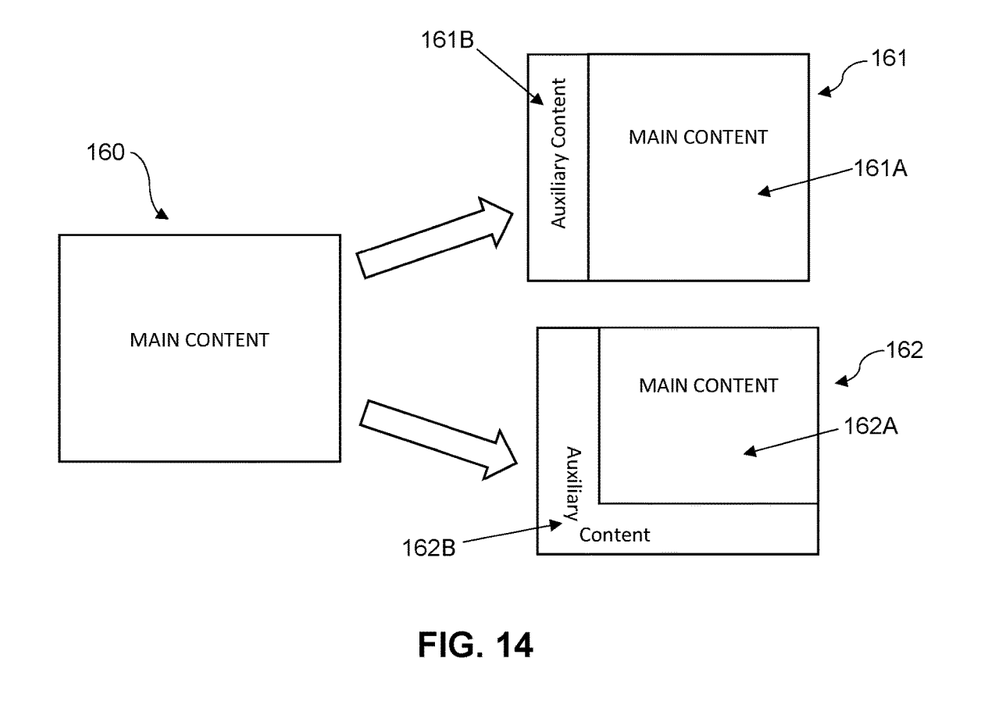
FIG. 14 is a schematic representation of an interface display displaying main content being separated into two different possible separated interface configurations for simultaneously displaying main content in a main interface display portion and auxiliary content in an auxiliary display portion in accordance with a non-restrictive illustrative embodiment of the present disclosure.

Turning now to FIG. 14, there is shown a graphical user interface 160 that the controller 20 can separate into a first separated mode configuration 161 or a second separated mode configuration 162 for example. In configuration 161, the main content shown in interface 160 is being displayed in main interface portion 161A and auxiliary content is being displayed in the auxiliary left band portion 161B. In configuration 162, the main content is being displayed in main interface portion 162A and the auxiliary content is being displayed in auxiliary L band portion 162B. The controller 20 provides for advertisements to be streamed in the auxiliary, portions 161B or 162B while the main content of interface 160 is shown in its entirety without being covered by bands but simply being resisted into interface portions 161A or 161B, This way, an advertisement can be simultaneously streamed with the main content being streamed without interruption or blockage (as it is re-sized). In an embodiment, the advertisements of the auxiliary content have no sound and enjoyment of the main content is not compromised.

Therefore, in essence, the controller ingests an advertisement into the streaming video and thus provides interface modes 161 or 162 for example for simultaneous streaming.

In an embodiment, the controller 20 is in communication with an advertisement server that wishes to stream advertisements as user's enjoy other content and rather than stopping the main content or covering it with an ad, the controller ingests it into a single frame (161 or 162) for simultaneous streaming.

Thus, the controller 20 performs the computer implementable step of blocking the main content from being stopped. The controller 20 identifies the advertisement content that is to run during streaming of a video as is in communication with the ad server and has identified the advertisement time stamp prior to the advertisement coming on and consequently blocking the main content during advertisement. The controller 20 provides for ingesting the advertisement content and streaming it without sound in the separated interface mode configuration of two or more interface portions.

A graphical user interface or GUI is both the program being hosted on server for being displayed and the display itself. The terms interface and GUI are interchangeable. An interface portion or a GUI portion is a portion of the overall GUI being displayed through the same screen. Yet an interface portion is also a separate GUI unto itself. An interface display is the interface being displayed through a device display (e.g. screen). An interface display portion is a part of the over visual frame or interface that hosts a separate GUI. Each interface display portion displays its own GUI (i.e. content). The content can be a stream, a video, a video game, or another interactive GUI etc. In essence the visual display of the screen is being split into separate displays with respective content that are independent from one another much like having multiple devices with respective screens. Yet, in this case multiple content can be viewed via the same screen. Separating, dividing or splitting the screen/interface can also be referred to as resizing the screen/interface wherein the main content being shown in the full screen is resized to become smaller as to fit another one or more interface display portions with respective content for simultaneous display via the same screen. Resizing also includes enlarging a given interface display portion to the full size of the interface display provided by the screen while removing the other portions and thus the resized portion becomes the interface display displaying its own and the sole GUI rather than multiple GUIs. Of course, resizing also includes reducing the size of main content running in the full screen (interface display) to be displayed in a smaller portion of the display thus allowing for other interface display portions to simultaneously run other content.

The various features described herein can be combined in a variety of ways within the context of the present disclosure so as to provide still other embodiments. As such, the embodiments are not mutually exclusive. Elements of the embodiments and examples discussed can be combined within the context of the disclosure as those having skill in the art will readily appreciate. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. A system for simultaneously displaying multiple graphical user interfaces via the same display, wherein the multiple graphical user interfaces are hosted by one or more remote host controllers, the system comprising:

a user device in operative communication with the one or more remote host controllers and comprising an interface display for displaying one or more of the multiple graphical user interfaces;

a system controller in operative communication with the user display device, the system controller having a processor with an associated memory of processor executable code that when executed provides the system controller with performing computer-implementable steps comprising:

separating the interface display in two or more interface display portions; and selectively providing for two or more of the graphical user interfaces to be simultaneously displayed via respective ones of the two or more interface display portions;

wherein the computer-implementable steps further comprise:

resizing, wherein the step of resizing comprises the system controller providing an application to be stored in the user display device for the resizing the one of the two or more interface display portions to a full size of the interface display and removing remaining ones of the two or more interface display portions, wherein the system controller performs the computer-implementable steps of detecting that the interface display portion has been separated.

2. The system according to claim 1, wherein the step of separating is automatically performed by the system controller.

3. The system according to claim 1, wherein the step of separating comprises the controller providing for the user to input a command via the user display device for separating the interface display.

4. The system according to claim 1, wherein the step of separating comprises the system controller providing an application to be stored in the user display device for separating the interface display in two or more interface display portions, wherein the system controller performs the computer implementable step of detecting that the interface display portion has been separated.

5. The system according to claim 1, wherein the computer-implementable steps further comprise:

resizing one of the two or more interface display portions to a full size of the interface display and removing remaining ones of the two or more interface display portions.

6. The system according to claim 5, wherein the step of resizing is automatically performed by the system controller.

7. The system according to claim 5, wherein the step of resizing comprises the system controller providing for the user to input a command via the user display device for the resizing the one of the two or more interface display portions to a full size of the interface display and removing remaining ones of the two or more interface display portions.

8. The system according to claim 1, wherein the computer-implementable steps further comprise:

providing the interface display prior to the step of separating to display a main graphical user interface; and resizing the main graphical user interface during the step of separating reducing the size thereof fit into one of the two or more interface display portions thereby providing the main graphical user interface to continue being displayed.

9. The system according to claim 1, wherein the computer-implementable steps further comprise:

selectively allowing sound from only one of the two or more of the graphical user interfaces to be emitted via the display device.

10. The system according to claim 1, wherein the two or more of the graphical user interfaces are selected from the group consisting of: video content, media content, video game content, web pages, advertisement web pages, e-shopping web pages, e-banking web pages, financial transaction pages, browser pages, computer applications, interactive web pages, websites, social networks, telecommunication applications, videoconferencing applications and any combination thereof.

11. The system according to claim 1, wherein one of the two or more graphical user interfaces comprises main content and the other of the two or more graphical user interfaces comprises auxiliary content.

12. The system according to claim 11, wherein the computer-implementable steps further comprise:

providing subject matter of the auxiliary content to be related to subject matter of the main content.

13. The system according to claim 11, wherein the computer-implementable steps further comprise:

selectively stopping advertisement blockers from blocking advertisement content in the auxiliary content.

14. The system according to claim 1, wherein the computer-implementable steps further comprise:

providing for one or more of the two or more graphical user interfaces to comprise content uploaded from a geographic location that is near the geographic location of the user display device.

15. The system according to claim 1, wherein one of the two or more graphical user interfaces comprises main content uploaded by a user having a user profile registered on in the memory of the system controller and another one of the two or more graphical user interfaces comprises advertisement content and shopping content, wherein the shopping content provides for device user to purchase goods and/or services, wherein the computer-implementable steps further comprise:

communicating with the remote host controller hosting the advertisement content and shopping content to detect if a purchase has been made; —determining the user that uploaded the main content that was simultaneously displayed with the advertisement content and shopping content; and providing a reward to the determined user.

16. The system according to claim 1, wherein the computer-implementable steps further comprise:

providing a user profile in the memory of the system controller; —providing a system user to input commands in the user profile via the display device to register user preferences.

17. The system according to claim 16, wherein the computer-implementable steps further comprise:—separating the interface display based on the user preferences.

18. A system according to claim 16, wherein the computer-implementable steps further comprise:—selectively providing for two or more of the graphical user interfaces to be simultaneously displayed based on the user preferences.

19. A system for simultaneously displaying multiple graphical user interfaces via the same display, wherein the multiple graphical user interfaces are hosted by one or more remote host controllers, the system comprising:

providing an interface display for displaying one or more of the multiple graphical user interfaces;

separating the interface display in two or more interface display portions; and selectively providing for two or more of the graphical user interfaces to be simultaneously displayed via respective ones of the two or more interface display portions;
wherein computer-implementable steps comprise:
  resizing, wherein the step of resizing comprises a system controller providing an application to be stored in the user display device for the resizing the one of the two or more interface display portions to a full size of the interface display and removing remaining ones of the two or more interface display portions, wherein the system controller performs the computer-implementable steps of detecting that the interface display portion has been separated.

\* \* \* \* \*